Figure 1:
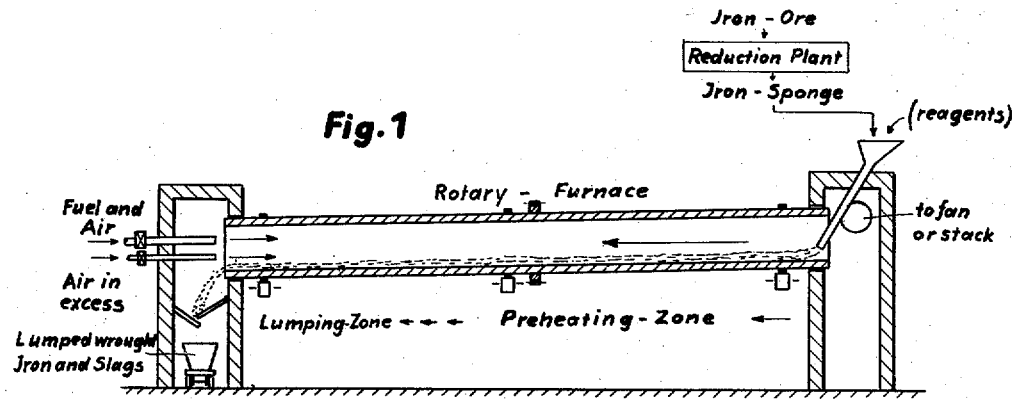

July 3, 1934. F. JOHANNSEN 1,964,917
PROCESS OF DIRECTLY PRODUCING WROUGHT IRON
Filed June 4, 1932 2 Sheets-Sheet 2

INVENTOR:
Friedrich Johannsen
BY Karl Viertel
ATTORNEY

Patented July 3, 1934

1,964,917

UNITED STATES PATENT OFFICE 1,964,917

PROCESS OF DIRECTLY PRODUCING WROUGHT IRON

Friedrich Johannsen, Magdeburg, Germany, assignor to Firm Fried. Krupp Grusonwerk Aktiengesellschaft, Magdeburg-Buckau, Germany Application June 4, 1932, Serial No. 615,322 In Germany June 5, 1931

8 Claims. (Cl. 75—14)

My invention relates to the problem of directly and continuously producing lumped wrought iron from ferriferous minerals and metallurgical products including crude ores, purple ores, slags, iron sponge etc.

A process for the production of wrought iron in the form of a ball from iron sponge has been proposed not long ago, according to which iron sponge is heated together with slag forming constituents to temperatures above the melting point of the slag forming material and below the melting of iron in an electrical furnace from which the air is excluded in order to avoid oxidation of the finely divided iron.

I have not been able to ascertain whether the said electrical process, of which the exclusion of air from the charge is an important feature, has been carried out in practice, and whether the production of wrought iron in such an electrically heated furnace is possible under conditions of economy. I have found in the course of my research work that in iron sponge usually a noticeable amount of unconsumed fuel used for the reduction is retained, and for this reason I anticipate that in said electrical process before the charge has been heated to welding temperatures a large proportion of the added slag forming iron oxides will have been transformed by the fuel retained in the sponge and by the sponge iron proper into metallic iron or a lower kind of oxide FeO or Fe₃O₄ with the result that in the lumping zone proper of the furnace too little oxygen is still available for the production of a highly heated slag sufficiently liquid, so as to freely flow out of the lumping iron.

Moreover inasmuch as temperatures of about 1300°-1400° centigrades and higher are required for carrying out the lumping process and as the whole amount of heat is exclusively produced by indirect heating through electricity this known process seems to be unprofitable in practice.

The principal object of my invention is to provide an improved process for directly producing wrought iron in the form of lumps of preferably small size, which can be carried out in practice in an economical manner as far as the consumption of fuel is concerned.

Another object of my invention is to thus carry out the process in practice that its progress and different stages can be readily observed and easily controlled in such manner that a maximum quantity of lumped wrought iron of high quality and slags containing only little iron are obtained.

Other objects of the invention will become incidentally apparent hereinafter. The nature and scope of the invention are briefly outlined in the appended claims and will be more fully understood from the following specification taken together with the accompanying drawings in which furnaces for carrying out the improved process in various modifications are diagrammatically shown by way of examples.

In contradistinction to the known process, referred to above for producing wrought iron with the exclusion of air, according to this invention oxidizing gases such as air or heating gases carrying with them air in excess are brought into direct contact locally and temporarily with the ferriferous materials under treatment under special conditions. Briefly characterized the improved process as applied to the direct production of lumped wrought iron from sponge iron comprises the following steps: Causing sponge iron to pass in a continuous layer through a metallurgical furnace and to be agitated and preheated therein up to temperatures, at which the sponge iron is about to lump, viz. ranging from about 900–1400° C.,—causing a current of oxidizing gases to so react with the preheated charge that a proportion of iron of the sponge is burnt and additional heat produced, sufficient for starting and accomplishing the lumping of the iron of the sponge and for incidentally producing from the iron oxides and the impurities of the sponge, such as silicic acid, magnesia, lime, alumina etc., slags, which are rich in iron oxides and sufficiently liquid as to readily flow out of the lumping iron—and causing the said slags and the lumped iron, embedded therein, to be discharged from the furnace for being separated from each other.

For the purposes of my invention I prefer to use a tubular rotary furnace open at both ends as shown in the drawings, in travelling through which the layer of material is given a rolling around and trundling motion.

The working of the furnace and more especially the conditions under which the reaction of the oxidizing gases with the charge occurs are controlled by the operator of the plant who can inspect the interior of the furnace through eye holes in the hoods at the upper and lower end of the furnace.

It is one of the salient points in this process that the iron oxides which are necessary for the slagging of the silicic acid, lime, alumina and the like, present in the iron sponge, are only produced at the place and moment of their use, by oxidation of relatively small quantities of iron so that high temperatures are produced locally and a superheated thin liquid slag is formed which freely flows out of the lumping iron. A special advantage lies in the fact that the lumping proper takes place at very high temperatures above 1400° C., while the average temperatures in the lumping zone are only 900°–1400°, a condition which means a considerable saving when compared with the known process referred to above, in which the whole charge is heated to the lumping temperature of the iron.

The nature and scope of my invention are briefly outlined in the appended claims and will be more fully understood by reading the following specification together with the accompanying drawings in which—

Figure 2:
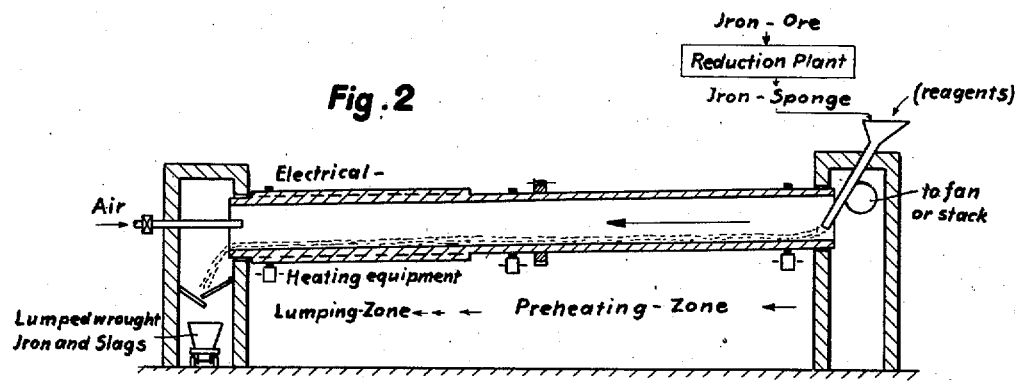
Figure 3:
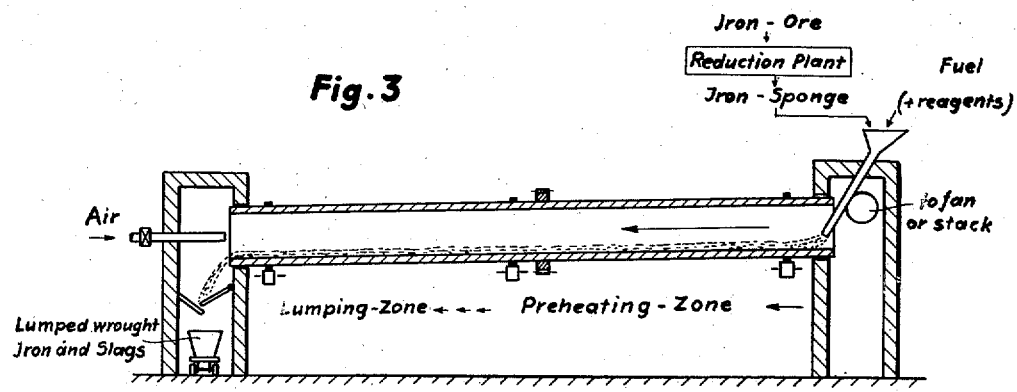
Figure 4:
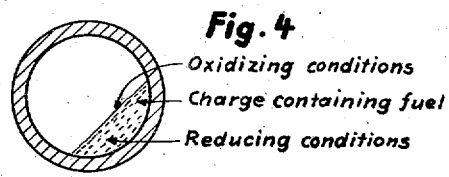
Figure 5:
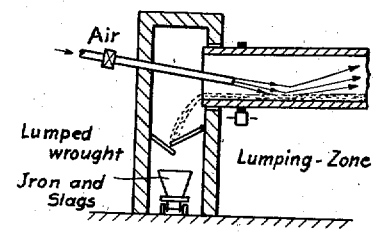
Figure 6:
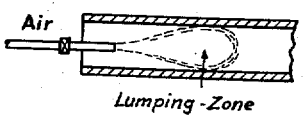
Figure 7:
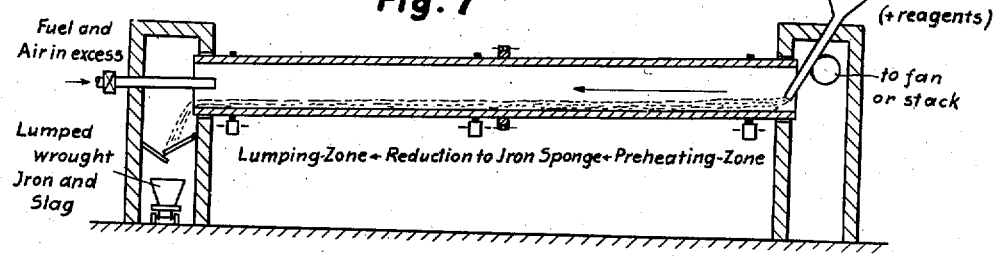
Figure 8:
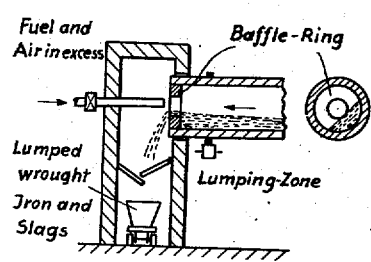
Figure 9:
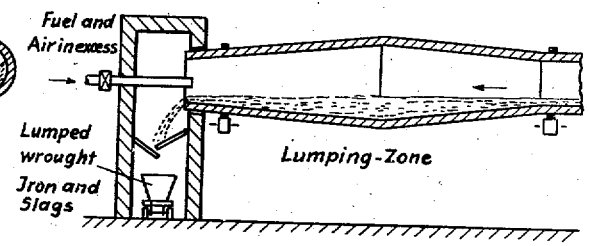
Figure 10:
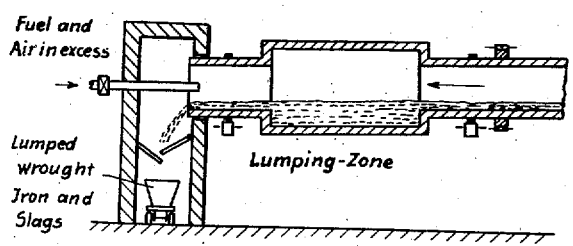
Figure 11:
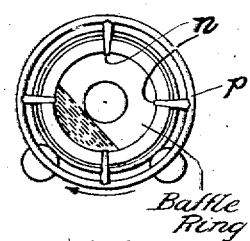

Fig. 1 is a diagrammatic lay-out showing in longitudinal section by way of an example a rotary tubular furnace for directly producing wrought iron according to my invention, the fuel being introduced at the discharge end of the furnace;

Fig. 2 diagrammatically shows a metallurgical furnace for the purpose of my invention which is provided with an electrical heating equipment and may be used to advantage in places, where electricity can be used as heating medium under conditions of economy;

Fig. 3 diagrammatically shows a rotary furnace for directly producing wrought iron according to this invention, the fuel being introduced at the intake end of the furnace;

Fig. 4 is a cross section through a rotary tubular furnace for the purposes of this invention showing diagrammatically the working conditions in the lumping zone;

Figs. 5 and 6 are sectional fragmentary views of the discharge end of a rotary tubular furnace for the purposes of this invention showing diagrammatically more in detail the introduction of the air into the furnace, Fig. 7 is a diagrammatic out-lay showing in longitudinal section a furnace in which the production of wrought iron according to this invention and the reduction of the iron ore to iron sponge are concurrently accomplished viz. in one and the same furnace;

Figs. 8–10 are fragmentary sections showing diagrammatically by way of examples the lumping zone section and the discharge end of rotary tubular furnaces for directly producing wrought iron according to this invention, Fig. 11 is a cross section through a structurally modified rotary tubular furnace for the purposes of this invention into which air is introduced through nozzles $n$ from a supply pipe $p$ surrounding the furnace.

I have found, that it is in many cases advantageous to thus carry out the lumping process that only a limited section of the surface of the charge is hit by the oxidizing gases. This can be done in the manner indicated in Figs. 5 and 6 viz. by causing a jet of air to impinge upon the charge; with the same result several jets of air may be blown into the furnace through the charge by means of nozzles arranged at the circumference of the furnace (as diagrammatically shown in Fig. 11).

I have succeeded in obtaining good results in practice by simply blowing or drawing air into the furnace through a baffle ring leaving a relatively narrow passage for the air to pass through in the form of a current of limited width, which on passing over the charge will retain its shape for a sufficient length of time as will be understood from Fig. 8.

Because of the yield of said slags, which are rich in iron oxides, being relatively small where sponge iron is used as the initial product for the production of lumped wrought iron according to this invention, the loss of iron with said slags—should the latter be thrown away and discarded altogether—would be a negligeable factor in many cases. However it is preferable to carry out the process according to this invention in a modified manner, whereby a substantial proportion of the iron oxides of the slags, obtained during the lumping action, are recovered—viz. converted into lumped wrought iron:

For this purpose additional fuel—for instance ground coke—is mixed with the iron sponge, preferably on entering the metallurgical furnace, the quantity of the fuel being so determined that a sufficient proportion of fuel, viz. in unburnt condition, is still present in the charge,—while the latter passes through the lumping zone and proceeds towards the exit of the furnace,—for reducing in one and the same cycle of reactions the iron oxides of the said slags, so that eventually slags relatively poor in iron oxides are discharged from the furnace jointly with lumps of wrought iron embedded therein.

Said process of in turn reducing the iron oxides of the slags may be conveniently facilitated and enhanced by collecting the charge, passing through the lumping zone and proceeding to the exit of the furnace, in a relatively thick layer: For instance a baffle ring referred to above, provided at the exit of the furnace, may be used as a convenient means for collecting the charge in a thick layer, as shown in Fig. 8.

In this manner the individual particles of the charge will be brought to the surface of the charge in relatively long intervals and during relatively short periods of time with the result that the high welding temperatures produced at the surface of the charge by the combustion of iron referred to above will substantially be retained locally at the surface of the charge.

The relatively large quantity of material thus accumulated in the lumping zone also renders it easier for the operator to cope with accidental changes in the working of the furnace.

Various sources of heat may be employed for heating up the charge to temperatures at which the iron within the charge is about to lump, including electricity as diagrammatically shown in Fig. 2, and fuel in various forms, e. g. carbonaceous solid materials such as coal, coke, also liquid and gaseous fuels.

A very convenient means for heating the furnace is to blow into the latter through a burner a flame produced by powdered coal or oil, and to introduce air in excess through the same burner or another pipe as indicated in Fig. 1; this method of heating is capable of quick adjustment both as regard the quantity of fuel and of the air in excess introduced into the furnace, a valuable feature in all cases when changes in the working conditions of the furnace and irregularities in the quality and size of the wrought iron lumps and in the iron content of the slags leaving the furnace call for attention and adjustment by the operator of the plant.

The heat required for heating the charge up to temperatures at which iron is about to weld may also be conveniently produced by the combustion of fuel introduced into the furnace jointly with the charge, as indicated in Figs. 3 and 7; this latter method of operation carries with it the advantage that the proportion of fuel and charge to each other can be so chosen that within the charge, while passing through the lumping zone, a rest of fuel will still be available for reacting with those iron oxides of the slag, which are produced at the surface of the charge.

As the result of the rolling around motion of the charge those slags rich in iron oxides are returned into the interior of the charge, wherein they are reduced by the said rest of fuel and with the result that a substantial quantity of the iron of the slags will be recovered.

Fig. 4 diagrammatically indicates this advantageous modification of the process: In one and the same cross sectional area of the furnace the surface of the charge is oxidized and overheated highly liquid slags are produced which at one hand are welcome at that very place where the lumping proper occurs, inasmuch as those liquid slags will freely flow out of the lumping iron, which however are wasteful inasmuch as they are rather rich of iron oxides; in the same cross sectional area of the furnace those slags rich in iron are in turn reduced within the charge to iron sponge through the reducing material and a large proportion of their iron is thus recovered.

In other words: While the lumping occurs a slag rich in iron as necessary for the proper cleaning of the iron from foreign components is readily produced and in the same working circle a very thorough separation into iron poor in slags and a slag poor in iron is accomplished. The produced iron lumps on account of their condensed and compact form will not be oxidized on passing out of the lumping zone.

The reducing agent viz. fuel present in or added to the charge also prevents premature oxidation of the latter in the preheating zone, because the combustion of the fuel present on the surface of the charge or of the reduction gases expelled from the charge will prevent the oxidizing gases, issuing from the lumping zone, to come into intimate contact with the charge in the preheating zone, while on the other hand in the lumping zone the greater mechanical energy of the current of oxidizing gases will cause the CO and $CO_2$ layer of gases upon the charge to be pushed aside laterally, so that the oxidizing gases will get ready access to the charge.

At the end of the process slags poor in iron and generally of a rather tough nature will pass out of the discharge end of the furnace in which are embedded compact lumps of wrought iron.

The said slags containing lumps of wrought iron are subjected to a comminuting and sifting process in which the smaller particles are separated from the compact lumps of iron. By subsequently dressing the finely comminuted slags for instance by magnetic separation, small granules of lumped iron and iron sponge contained in the slags may be recovered and collected so as to form an intermediate product enriched in iron which is returned into the furnace.

Various other changes and modifications besides those mentioned above may be made in connection with my improved process and in the structural details of furnaces used for carrying the same out in practice so as to comply with specific conditions:

In many cases, for instance if the content in gangue is so small that a magnetic separation of the spongy iron from the gangue can be dispensed with, the production of the sponge and of the lumped wrought iron may be carried out to advantage in one continuous process, preferably in one and the same furnace.

The waste gases passing out of the lumping zone which is usually only a few meters long, contain as a rule very little or no free oxygen; their immanent heat however is still so large that—especially if conveniently augmented by the addition of fuel and air—a rather long zone in the furnace can be heated up thereby to a mean temperature of 600-900° C., viz. sufficiently high for effectively reducing ferriferous raw materials. I have found that a rather long zone in which temperatures of this range prevail is very suitable for the production of iron sponge.

Whenever in the ferriferous raw material or in the fuel added to the latter impurities are contained which would impair the quality of the wrought iron, e. g. sulfur or arsenic I have found it advisable to add in such cases reagents appropriately reacting with the said impurities so as to remove the latter from the iron.

Reagents suitable for the removal of sulfur are lime or manganese oxides which combine with the sulfur into a fire-resisting form, or alkali metals producing the sulfur a thinly liquid sulfur compound, or substances which form with the sulphur easily volatilized compounds e. g. antimony, lead and tin. The volatilization of sulfur and arsenic may be conveniently enhanced also by the addition of substances containing chlorine.

Instead of providing the rotary furnace with a baffle ring referred to above and being used for collecting the charge in a relatively thick layer, the furnace may be conically formed with its diameter gradually decreasing towards the discharge end, as shown in Fig. 9, or the furnace may be given at the lumping zone a larger diameter than at the rest of the furnace, as shown in Fig. 10.

Obviously various means and expedients known per se in the metallurgical field may be conveniently used in addition to those described hereinbefore for carrying out my invention in practice so as to obtain a still higher economy in the consumption of fuel and in the yield of wrought iron from the raw material.

For instance the air or the oxidizing gases blown or drawn into the furnace may be preheated and checking valves used for accurately regulating the quantity of gases entering the furnace.

An auxiliary burner—not shown— may be employed to advantage for introducing additional heat into the furnace in cases, when only air—no heating gases—and fuel, added to the charge, are introduced into the furnace, and the heat produced within the latter accidentally drops below the normal temperatures at which the lumping of the iron occurs.

An auxiliary burner of this kind may be conveniently used also in starting the process and speeding up the production of heat within the furnace while the process is in progress.

Convenient mechanical contrivances known per se for changing the inclination of the furnace and its rotary speed may be applied, by which the total length of time of travel of the charge through the furnace and of the reaction of the oxidizing gases upon the charge can be conveniently adjusted.

In order to enable practitioners in the metallurgical field to successfully carry out the above process in practice I will briefly state under which conditions I have succeeded to convert roasted pyrites in one and the same furnace initially into iron sponge and finally into wrought iron:

A rotary furnace of 2.5 meters diameter and 40 m. in length was used, provided at the discharge end with a baffle ring, the inner diameter of which was 0.8 m. There were treated daily about 100 tons of roasted pyrites of 42% Fe content to which 30% waste coke were added. After the process had been brought by initial supplementary firing into a state of permanency, instead of heating gases compressed air was blown into the furnace by a fan through the baffle ring opening, and these working conditions were maintained during a further eight-days trial working. The inclination of the furnace amounted to 2% and the total time of travel of the material through the furnace was about 6 to 8 hours.

So extensive a reduction to iron sponge took place in the zone of medium temperature of 600 to 900° C., that the material no longer fused on entering the lumping zone, although the roasted pyrites under treatment still contained 12% silicic acid. At the discharge end of the furnace in which temperatures of 1300–1400° centigrade were ascertained by measurement lumps of iron of the size from peas up to walnuts were obtained, embedded in moderately soft, rather tough slags, poor in iron, containing only about 2–3% Fe and being rich in silicic acid.

What I claim is:

1. Process of producing lumped wrought iron which comprises causing a charge of sponge iron to pass through a metallurgical furnace, agitating the charge therein and preheating it up to temperatures at which the sponge iron is about to lump, ranging from about 900 to 1400° centigrade causing a current of oxidizing gases to react with the preheated charge, whereby a proportion of iron of the sponge is burnt and additional heat produced, sufficient for starting and accomplishing the lumping of the iron of the sponge and for producing from the iron oxides and the slag forming constituents of the sponge, which are fluxible by iron oxide, slags rich in iron oxides and sufficiently liquid to flow out of the lumping iron, and causing said slags and the lumped iron embedded therein to flow from the furnace.

2. Process of producing lumped wrought iron which comprises causing a charge of sponge iron to pass through a metallurgical furnace, agitating the charge therein and preheating it up to temperatures, at which the sponge iron is about to lump, ranging from about 900 to 1400° centigrade, causing a jet of oxidizing gases to react with a section of the surface of the preheated charge, whereby a proportion of iron of the sponge is burnt and additional heat produced, sufficient for starting and accomplishing the lumping of the iron of the sponge and for producing from the iron-oxides and the slag forming constituents of the sponge, which are fluxible iron oxide, slags rich in iron oxides and sufficiently liquid as to flow out of the lumping iron, and causing said slags and lumped iron embedded therein to flow from the furnace.

3. Process of producing wrought iron which comprises causing a charge of sponge iron, mixed with corbonaceous fuel, to pass through a metallurgical furnace, agitating the charge therein and preheating it up to temperatures, at which the sponge iron is about to lump, ranging from about 900 to 1400° centigrade, causing a current of oxidizing gases to react with the preheated charge, whereby a proportion of iron of the sponge is burnt and additional heat is produced, sufficient for starting and accomplishing the lumping of the iron of the sponge and for producing from the iron oxides and the slag forming constituents of the sponge, which are fluxible by iron oxide, slags rich in iron oxides and sufficiently liquid as to flow out of the lumping iron, causing iron oxides from said slags to be re-converted into lumped iron, by so determining the quantity of fuel added to the sponge iron, that a sufficient proportion of unconsumed fuel is present in the charge on passing through the lumping zone and to the exit of the furnace for reducing in one and the same cycle of reactions iron oxides of said slags, and causing said slags and lumped iron embedded therein to flow from the furnace.

4. Process of producing wrought iron which comprises causing a charge of sponge iron, mixed with carbonaceous fuel, to pass through a metallurgical furnace, agitating said charge therein, preheating it up to temperatures at which the sponge iron is about to lump, ranging from about 900 to 1400° centigrade, causing a jet of oxidizing gases to react with a section of the surface of the preheated charge, whereby a proportion of iron of the sponge is burnt and additional heat is produced, sufficient for starting and accomplishing the lumping of the iron of the sponge and for producing from the iron oxides and the slag forming constituents of the sponge, which are fluxible by iron oxide, slags rich in iron oxides and sufficiently liquid as to flow out of the lumping iron, causing iron oxides from said slags to be re-converted into lumped wrought iron by so determining the quantity of fuel, added to the sponge iron that a sufficient proportion of unconsumed fuel is present in the charge on passing through the lumping zone and to the exit of the furnace for reducing in one and the same cycle of reactions iron oxides of said slags, and causing said slags and lumped iron embedded therein to flow from the furnace.

5. Process of producing wrought iron which comprises causing a charge of ferriferous material, mixed with carbonaceous fuel, to pass in a layer through a metallurgical furnace agitating the charge therein and preheating it up to temperatures at which the iron compounds of the material are converted into iron sponge, ranging from 600 to 900° centigrade, causing the sponge iron containing material to be further preheated up to temperatures at which the sponge iron is about to lump, ranging from about 900 to 1400° centigrade, causing a current of oxidizing gases to react with the preheated charge, whereby a proportion of iron of the sponge is burnt and additional heat is produced, sufficient for starting and accomplishing the lumping of the iron of the sponge and for producing from the iron oxides and the slag forming constituents of the ore, which are fluxible by iron oxide, slags rich in iron oxides and sufficiently liquid as to flow out of the lumping iron, causing iron oxides from said slags to be re-converted into lumped wrought iron, by so determining the quantity of fuel added to the charge, that a sufficient proportion of unconsumed fuel is still present in the charge on passing through the lumping zone and to the exit of the furnace for reducing in one and the same cycle of reactions iron oxides of said slags, and causing said slags and lumped iron embedded therein to flow from the furnace.

6. Process of producing wrought iron which comprises causing a charge of ferriferous material, mixed with carbonaceous fuel, to pass through a metallurgical furnace, agitating the charge therein and preheating it up to temperatures, at which the iron compounds of the material are converted into sponge iron, ranging from 600 to 900° C., causing the sponge iron containing material to be further preheated up to temperatures, at which the sponge iron is about to lump, ranging from about 900 to 1400° centigrade, causing a jet of oxidizing gases to react with a section of the preheated charge, whereby a proportion of iron of the sponge is burnt and additional heat is produced, sufficient for starting and accomplishing the lumping of the iron of the sponge and for producing from the iron oxides and the slag forming constituents of the sponge, which are fluxible by iron oxide, slags rich in iron oxides and sufficiently liquid as to flow out of the lumping iron, causing iron oxides from said slags to be reconverted into lumped wrought iron, by so determining the quantity of fuel added to the charge, that a sufficient proportion of unconsumed fuel is still present in the charge on passing through the lumping zone and to the exit of the furnace for reducing in one and the same cycle of reactions iron oxides of said slags, and causing said slags and lumped iron embedded therein to flow from the furnace.

7. Process of producing lumped wrought iron which comprises passing a charge of sponge iron, mixed with carbonaceous fuel in a layer through a metallurgical furnace, agitating the charge and preheating it up to temperatures ranging from about 900 to 1400° centigrade, at which the sponge iron is about to lump, causing a current of oxidizing gases to react with the preheated charge whereby a proportion of iron of the sponge is burnt and additional heat produced, sufficient for starting and accomplishing the lumping of the iron of the sponge and for producing from the iron oxides and the slag forming constituents of the sponge, which are fluxible by iron oxide, slags rich in iron oxides and sufficiently liquid as to flow out of the lumping iron, causing iron oxides from said slags to be reconverted into lumped iron by so determining the quantity of the fuel, added to the sponge iron that a sufficient proportion of unconsumed fuel is still present in the charge on passing through the lumping zone and to the exit of the furnace for reducing in one and the same cycle of reactions iron oxides of said slags, collecting the charge in the lumping zone in a relatively thick layer, and causing the slags and the lumped iron embedded therein to flow from the furnace.

8. Process of producing lumped wrought iron which comprises causing a charge of ferriferous material, mixed with carbonaceous fuel, to pass through a metallurgical furnace, agitating the charge therein and preheating it up to temperatures at which the iron compounds of the material are converted into sponge iron, ranging from 600 to 900° centigrade, causing the sponge iron containing material to be further preheated up to temperatures at which the sponge iron is about to lump, ranging from about 900 to 1400° centigrade, causing a jet of oxidizing gases to react with a section of the preheated charge, whereby a proportion of iron of the sponge is burnt and additional heat is produced, sufficient for starting and accomplishing the lumping of the iron of the sponge and for producing from the iron oxides and the slag forming constituents of the sponge, which are fluxible by iron oxide, slags rich in iron oxide and sufficiently liquid so as to flow out of the lumping iron, causing iron oxides from said slags to be reconverted into lumped wrought iron by so determining the quantity of fuel added to the charge, that a sufficient proportion of unconsumed fuel is still present in the charge on passing through the lumping zone and to the exit of the furnace for reducing in one and the same cycle of reactions iron oxides of said slags, collecting the charge in the lumping zone in a relatively thick layer, and causing the slags and lumped iron embedded therein to flow from the furnace.

FRIEDRICH JOHANNSEN.

CERTIFICATE OF CORRECTION.

Patent No. 1,964,917.

July 3, 1934.

FRIEDRICH JOHANNSEN.

It is hereby certified that error appears in the printed specification of the above numbered patent requiring correction as follows: Page 2, line 42, for "out-lay" read lay-out; page 3, line 100, after "producing" insert the word with; page 4, line 58, claim 2, before "iron" insert the word by; and line 65, claim 3, for "corbonaceous" read carbonaceous; and that the said Letters Patent should be read with these corrections therein that the same may conform to the record of the case in the Patent Office.

Signed and sealed this 16th day of July, A. D. 1935.

Leslie Frazer
Acting Commissioner of Patents.

(Seal)

tures, at which the iron compounds of the material are converted into sponge iron, ranging from 600 to 900° C., causing the sponge iron containing material to be further preheated up to temperatures, at which the sponge iron is about to lump, ranging from about 900 to 1400° centigrade, causing a jet of oxidizing gases to react with a section of the preheated charge, whereby a proportion of iron of the sponge is burnt and additional heat is produced, sufficient for starting and accomplishing the lumping of the iron of the sponge and for producing from the iron oxides and the slag forming constituents of the sponge, which are fluxible by iron oxide, slags rich in iron oxides and sufficiently liquid as to flow out of the lumping iron, causing iron oxides from said slags to be reconverted into lumped wrought iron, by so determining the quantity of fuel added to the charge, that a sufficient proportion of unconsumed fuel is still present in the charge on passing through the lumping zone and to the exit of the furnace for reducing in one and the same cycle of reactions iron oxides of said slags, and causing said slags and lumped iron embedded therein to flow from the furnace.

7. Process of producing lumped wrought iron which comprises passing a charge of sponge iron, mixed with carbonaceous fuel in a layer through a metallurgical furnace, agitating the charge and preheating it up to temperatures ranging from about 900 to 1400° centigrade, at which the sponge iron is about to lump, causing a current of oxidizing gases to react with the preheated charge whereby a proportion of iron of the sponge is burnt and additional heat produced, sufficient for starting and accomplishing the lumping of the iron of the sponge and for producing from the iron oxides and the slag forming constituents of the sponge, which are fluxible by iron oxide, slags rich in iron oxides and sufficiently liquid as to flow out of the lumping iron, causing iron oxides from said slags to be reconverted into lumped iron by so determining the quantity of the fuel, added to the sponge iron that a sufficient proportion of unconsumed fuel is still present in the charge on passing through the lumping zone and to the exit of the furnace for reducing in one and the same cycle of reactions iron oxides of said slags, collecting the charge in the lumping zone in a relatively thick layer, and causing the slags and the lumped iron embedded therein to flow from the furnace.

8. Process of producing lumped wrought iron which comprises causing a charge of ferriferous material, mixed with carbonaceous fuel, to pass through a metallurgical furnace, agitating the charge therein and preheating it up to temperatures at which the iron compounds of the material are converted into sponge iron, ranging from 600 to 900° centigrade, causing the sponge iron containing material to be further preheated up to temperatures at which the sponge iron is about to lump, ranging from about 900 to 1400° centigrade, causing a jet of oxidizing gases to react with a section of the preheated charge, whereby a proportion of iron of the sponge is burnt and additional heat is produced, sufficient for starting and accomplishing the lumping of the iron of the sponge and for producing from the iron oxides and the slag forming constituents of the sponge, which are fluxible by iron oxide, slags rich in iron oxide and sufficiently liquid so as to flow out of the lumping iron, causing iron oxides from said slags to be reconverted into lumped wrought iron by so determining the quantity of fuel added to the charge, that a sufficient proportion of unconsumed fuel is still present in the charge on passing through the lumping zone and to the exit of the furnace for reducing in one and the same cycle of reactions iron oxides of said slags, collecting the charge in the lumping zone in a relatively thick layer, and causing the slags and lumped iron embedded therein to flow from the furnace.

FRIEDRICH JOHANNSEN.

CERTIFICATE OF CORRECTION.

Patent No. 1,964,917.                                     July 3, 1934.

FRIEDRICH JOHANNSEN.

It is hereby certified that error appears in the printed specification of the above numbered patent requiring correction as follows: Page 2, line 42, for "out-lay" read lay-out; page 3, line 100, after "producing" insert the word with; page 4, line 58, claim 2, before "iron" insert the word by; and line 65, claim 3, for "corbonaceous" read carbonaceous; and that the said Letters Patent should be read with these corrections therein that the same may conform to the record of the case in the Patent Office.

Signed and sealed this 16th day of July, A. D. 1935.

Leslie Frazer
(Seal)                                       Acting Commissioner of Patents.